(12) United States Patent
Holmes

(10) Patent No.: US 7,845,065 B2
(45) Date of Patent: Dec. 7, 2010

(54) METHOD OF MAKING A ROTATING ELECTRIC MACHINE STATOR CORE

(75) Inventor: Alan G. Holmes, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 390 days.

(21) Appl. No.: 11/936,271

(22) Filed: Nov. 7, 2007

(65) Prior Publication Data

US 2009/0113696 A1    May 7, 2009

(51) Int. Cl.
*H02K 15/00* (2006.01)
(52) U.S. Cl. .................. 29/596; 29/419.2; 29/609; 310/40 R; 310/216.004
(58) Field of Classification Search .................. 29/296, 29/419.2, 426.5, 598, 605, 606, 609; 310/40 R, 310/216.004, 216.098, 216.113
See application file for complete search history.

(56) References Cited

U.S. PATENT DOCUMENTS

| 5,671,524 A | 9/1997 | Damsky et al. |
| 6,880,229 B2 * | 4/2005 | Zepp et al. ..................... 29/596 |
| 2004/0135459 A1 | 7/2004 | Koshiishi et al. |

FOREIGN PATENT DOCUMENTS

CN        1272244 A     11/2000

* cited by examiner

*Primary Examiner*—Thiem Phan

(57) ABSTRACT

A method of making a motor stator core having a back iron and a plurality of teeth extending radially inward from the back iron includes providing the plurality of teeth and the back iron from oriented steel so that a magnetic flux transmission path is formed with superior properties in essentially one direction. At least one of the plurality of teeth and the back iron is annealed in selected portions so as to improve magnetic flux transmission in a second direction, different from the one direction.

13 Claims, 2 Drawing Sheets

METHOD OF MAKING A ROTATING ELECTRIC MACHINE STATOR CORE

TECHNICAL FIELD

This disclosure relates to methods of making motor stator cores.

BACKGROUND

Motor cores are usually made out of sheets of steel material, which can be oriented or non-oriented. Oriented steel has oriented, or anisotropic, properties in the direction that the steel is stretched or rolled, thereby having superior magnetic properties in that direction of rolling. On the other hand, oriented steel has inferior properties in the other, crosswise directions of rolling. Since stator cores of motors are round and have flux flowing in perpendicular directions in the teeth (radial direction) and back iron (around the circumference), the use of oriented steel helps magnetic flux transmission in one area of the stator, but hurts it just as much in a different area of the stator so that its overall effect is usually zero. Thus, almost all motors use non-oriented steel.

In non-oriented steel, the steel is typically rolled in one direction and punched using dies into the desired shape. In many cases, the entire piece is then annealed to remove any incidental directional properties due to rolling and punching. As a result, the magnetic flux in motors made of non-oriented steel flow through the steel moderately well in any direction with no direction of flow being superior to another and no direction being inferior to another.

However, it would be desirable to provide a motor stator that utilizes the benefits of both oriented and non-oriented steel so as to obtain the more efficient, magnetic flux transmission in some areas of the stator without sacrificing magnetic flux transmission in a direction cross-wise to those areas.

SUMMARY

A method of making a motor stator core having a back iron and a plurality of teeth extending radially inward from the back iron includes providing the plurality of teeth and the back iron from oriented steel so that a magnetic flux transmission path is formed with superior properties in essentially one direction. At least one of the plurality of teeth and the back iron is annealed in selected portions so as to improve magnetic flux transmission in a second direction, different from the one direction, such as the direction perpendicular to the one direction.

BRIEF DESCRIPTION OF THE DRAWINGS

One or more embodiments will now be described, by way of example, with reference to the accompanying drawings, in which.

DETAILED DESCRIPTION

Figure 1:
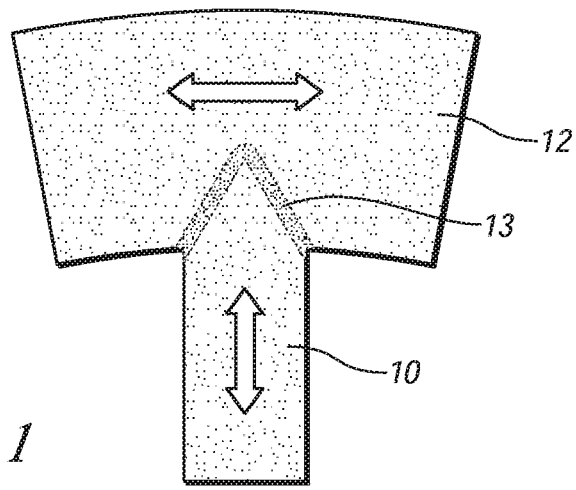
FIG. 1 is a cross-sectional view of a tooth and a portion of a back iron of a segmented stator made in accordance with the present disclosure.
Figure 2:
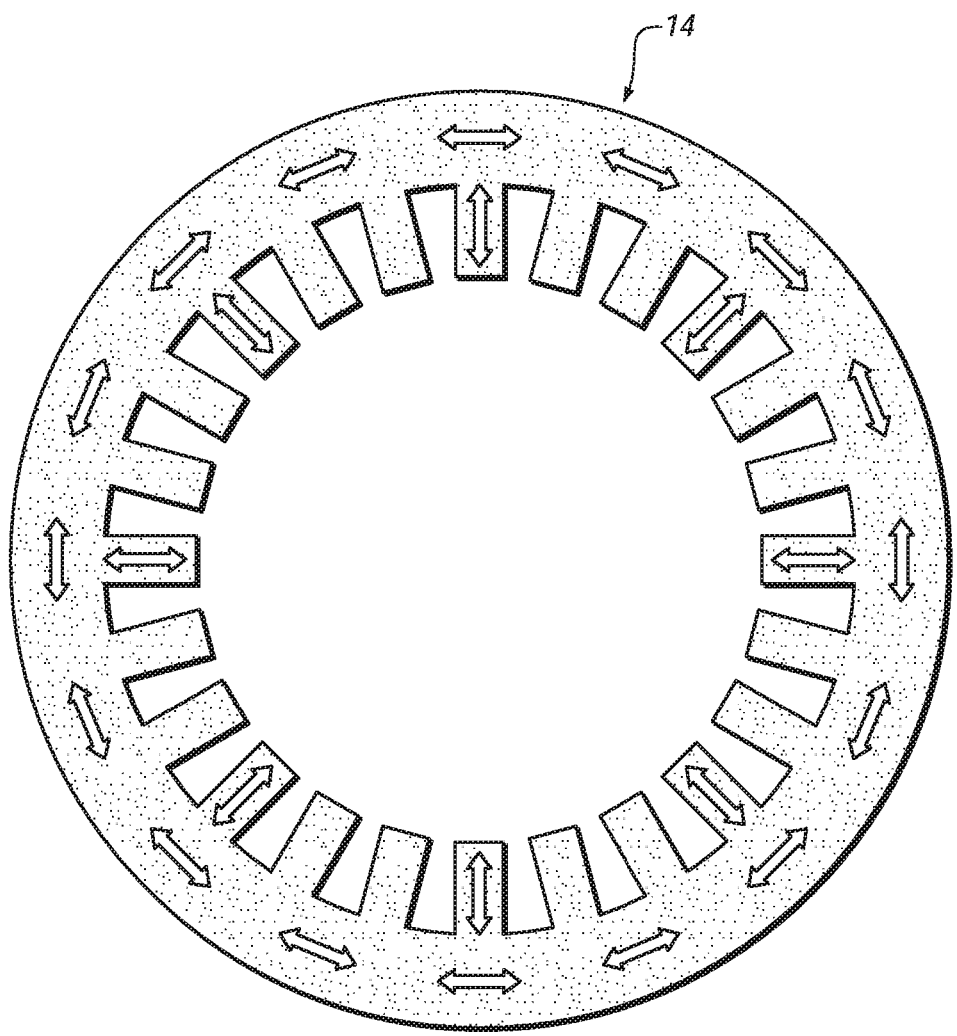
FIG. 2 is a cross-sectional view of a stator core made in accordance with a first embodiment of the method of the present disclosure.

Referring now to the drawings, wherein the showings are for the purpose of illustrating certain exemplary embodiments only and not for the purpose of limiting the same, FIG. 1 shows a segmented motor stator core made in accordance with the method of the present disclosure. A segmented stator core is typically utilized in small motors because the wires can be wound very closely around the individual segments before assembly into a circular stator. First the steel is rolled in a first direction and the individual teeth 10 and back iron portions 12 are punched so that the magnetic flux transmission path would be in a lengthwise direction in both portions as shown by the double ended arrows of FIG. 1. Then, each of the teeth are coupled to the back iron portions via welding so that the magnetic flux transmission path of the teeth is perpendicular to the magnetic flux transmission path of the back iron with a region of annealed, non-oriented steel 13 (e.g. weld) between them. Once the individual segments are assembled, the stator core 14 will have the magnetic flux transmission paths with superior properties in the directions as shown in FIG. 2.

Figure 3:
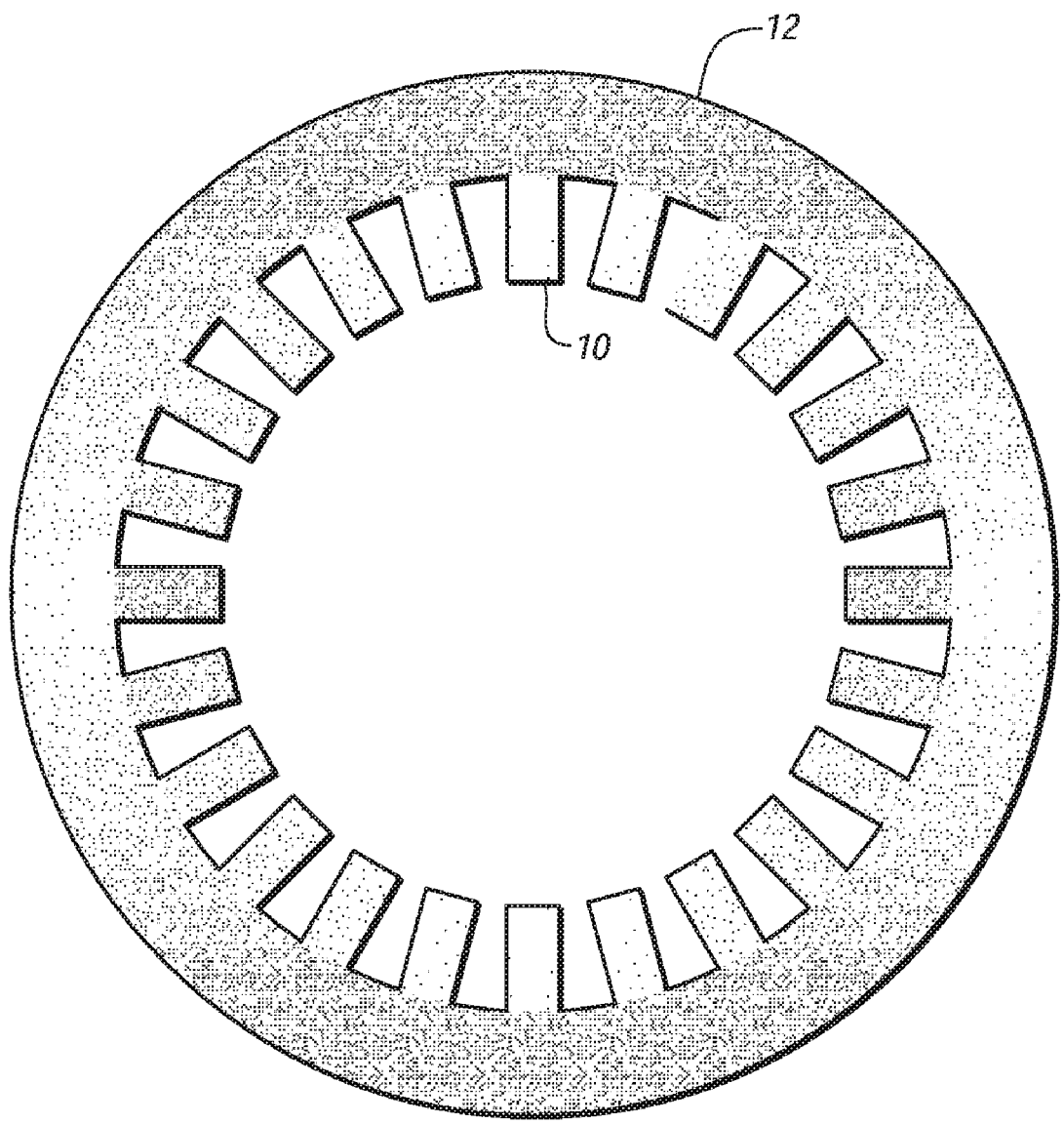
FIG. 3 is a cross-sectional view of a stator core made in accordance with a second embodiment of the method of the present disclosure.

Turning now to FIG. 3, there is shown a motor stator core made of a continuous circular stator comprising a plurality of teeth 10 extending radially inward from the continuous back iron 12. In this application, the stator is punched from steel rolled in one direction. This type of stator is more difficult to improve because the magnetic properties of the oriented steel are in one direction all of the way around each lamination. In one embodiment, a portion of the teeth 10 are annealed to remove the directional properties, such as at the 12 o'clock and 6 o'clock positions. Portions of the back iron 12 are annealed at areas perpendicular to the annealed teeth 10, such as at the 3 o'clock and 9 o'clock positions. Another portion of the teeth 10 are not annealed, such as at the 3 o'clock and 9 o'clock positions. Other portions of the back iron are not annealed, such as the 12 o'clock and 6 o'clock positions. The teeth and back iron in the positions not already described would then receive some intermediate degree of annealing.

This annealing of the teeth and back iron in selected portions will improve magnetic flux transmission in the core of the completed motor in the annealed portions because, prior to annealing, the superior direction for magnetic flux in the pre-annealed oriented material is not substantially aligned in all places around the stator with the magnetic flux that will be developed in normal operation.

For the embodiment shown in FIG. 3, the stator core can be stacked in a staggered pattern, wherein the annealed portions would be at a predetermined angle between each lamination or group thereof in the stack, such as 120 degrees. In this case, each feature of the stacked stator core, such as a given tooth 10, would be composed partly of core material with the orientation at or near the most helpful direction and partly of material having been annealed and therefore having no orientation. Thus, according to this embodiment of the disclosure, the magnetic properties of the completed stator core would be improved over a stator core composed entirely of non-oriented material.

The annealing of the continuous stator can be by applying energy to the selective portions. In a first method, energy, such as heat, can be applied suddenly to selective portions of the stator to heat it significantly above the threshold temperature for annealing, so that annealing takes place relatively quickly, and then cooling the selective portions before the temperature of the remainder of the stator has increased to the annealing temperature. Alternatively, the energy can be applied to the selective portions while simultaneously cooling the non-selective portions so as to establish an essentially steady-state temperature gradient in the stator for the annealing process, so that some of the stator is above annealing temperature and some of the stator is below the annealing temperature.

Thus, by selectively annealing portions of the stator core where directional properties work against the overall performance of the motor, such as in the back iron, while leaving the directional properties intact where they aid the overall performance of the motor, such as the teeth, the core losses are decreased while the efficiency is improved.

Core losses can be used to apply energy selectively to the stator core. Applying a strong, fluctuating or alternating magnetic field to the stator core with a similar pattern of magnetic flux as the motor would develop in normal operation will cause greater losses, and therefore greater heat to be applied, in portions of the stator core where directional properties of the oriented steel would work against the overall performance of the motor in normal operation. That is, a rapidly varying magnetic flux traveling around the back iron, which the stator will develop in normal operation, will cause the greatest heating wherever in the back iron that the superior direction for the transmission of magnetic flux is crosswise to the flux. This heat gradient is beneficially utilized to selectively anneal those portions where heating is greatest (i.e. portions where flux transmission is least efficient).

The invention claimed is:

1. Method of making a rotating electric machine stator core having an annular back iron and a plurality teeth extending radially inward from the back iron, the method comprising:
   providing the motor stator core made from an oriented steel that has superior magnetic properties which are aligned in essentially one direction; and
   annealing selected portions of the oriented steel to remove the superior magnetic properties in the selected portions wherein, prior to annealing, said selected portions have the superior magnetic properties which are not substantially aligned with operational magnetic flux paths of the stator core.

2. The method as recited in claim 1 wherein annealing the selected portions of the oriented steel includes annealing only selected teeth wherein, prior to annealing, said selected teeth have the superior magnetic properties which are not substantially radially aligned.

3. The method as recited in claim 1 wherein providing the motor stator core comprises stacking a plurality of stator laminations made from the oriented steel, wherein each stator lamination comprises an annular lamination back iron and a plurality of lamination teeth extending radially inward from the annular lamination back iron and wherein annealing the selected portions of the oriented steel comprises:
   annealing selected lamination teeth wherein, prior to annealing, said selected lamination teeth have the superior magnetic properties which are not substantially radially aligned; and
   annealing selected portions of the annular back iron wherein, prior to annealing, said selected portions of the annular back iron have the superior magnetic properties which are not substantially annularly aligned.

4. The method as recited in claim 3 wherein stacking the plurality of stator laminations comprises angularly staggering the stator laminations.

5. The method as recited in claim 1 wherein annealing the selected portions of the oriented steel includes applying energy to the selected portions by using a rapidly changing magnetic field within the stator core similar to the operational magnetic flux paths of the stator core whereby greater heating of the selected portions of the oriented steel preferentially anneals the selected portions of the oriented steel over the non-selected portions of the oriented steel.

6. The method as recited in claim 1 wherein annealing the selected portions of the oriented steel includes applying heat to the selected portions of the oriented steel at a high temperature followed by cooling the selected portions of the oriented steel.

7. The method as recited in claim 1 wherein annealing the selected portions of the oriented steel includes applying heat to the selected portions of the oriented steel while simultaneously cooling non-selected portions of the oriented steel.

8. The method as recited in claim 1 wherein annealing the selected portions of the oriented steel includes annealing only selected portions of the annular back iron wherein, prior to annealing, said selected portions of the annular back iron have the superior magnetic properties which are not substantially annularly aligned.

9. The method as recited in claim 1 wherein annealing the selected portions of the oriented steel includes annealing selected portions of the annular back iron wherein, prior to annealing, said selected portions of the annular back iron have the superior magnetic properties which are not substantially annularly aligned, and annealing selected teeth wherein, prior to annealing, said selected teeth have the superior magnetic properties which are not substantially radially aligned.

10. The method as recited in claim 1 wherein providing the motor stator core comprises stacking a plurality of stator laminations made from the oriented steel, wherein each stator lamination comprises an annular lamination back iron and a plurality of lamination teeth extending radially inward from the annular lamination back iron and wherein annealing the selected portions of the oriented steel comprises:
   annealing only selected lamination teeth wherein, prior to annealing, said selected lamination teeth have the superior magnetic properties which are not substantially radially aligned.

11. The method as recited in claim 10 wherein stacking the plurality of stator laminations comprises angularly staggering the stator laminations.

12. The method as recited in claim 1 wherein providing the motor stator core comprises stacking a plurality of stator laminations made from the oriented steel, wherein each stator lamination comprises an annular lamination back iron and a plurality of lamination teeth extending radially inward from the annular lamination back iron and wherein annealing the selected portions of the oriented steel comprises:
   annealing only selected portions of the annular back iron wherein, prior to annealing, said selected portions of the annular back iron have the superior magnetic properties which are not substantially annularly aligned.

13. The method as recited in claim 12 wherein stacking the plurality of stator laminations comprises angularly staggering the stator laminations.

* * * * *